3,090,770
BLENDED POLYETHYLENE COMPOSITIONS OF IMPROVED CLARITY AND METHOD OF MAKING SAME
Razmic S. Gregorian, Silver Spring, Md., assignor to W. R. Grace & Co., Clarksville, Md., a corporation of Connecticut
No Drawing. Filed Apr. 26, 1960, Ser. No. 24,652
3 Claims. (Cl. 260—45.5)

This invention relates to a method of preparing a polyethylene product. More particularly this invention is directed to producing a polyethylene composition of improved clarity without substantially affecting its flow properties.

Polymers of ethylene such as those described in Belgian 533,362 issued to K. Ziegler and in U.S. 2,816,883, issued to Larchar et al., are well known in the art today and are generally characterized by their organic solvent solubility and thermoplastic or flow properties. Polyethylenes produced in accordance with the aforesaid patent references are herein considered to be high density polyethylene, i.e., having a density in the range 0.94–0.97.

The advent of high density polyethylene introduced many problems in the commercial field. For instance, in comparison with conventional low density polyethylene (0.92) as described in U.S. 2,153,553 issued to E. Fawcett et al., high density polyethylene has an inferior clarity.

Lately, several methods have been tried to increase the clarity of high density polyethylene to foster their commercial acceptability in fields, e.g. films, coatings, etc., wherein clarity is a requisite. The art has discovered that crosslinking of high density polyethylene improves the clarity thereof, and various methods have been employed in this direction. Such methods include crosslinking by irradiation and also by chemical reaction using, e.g., peroxides, diperoxides, hydroperoxides or azo-compounds as crosslinking agents, followed by subjecting the polymer to a curing step at elevated temperatures in order to obtain uniform crosslinking and improved clarity. However, it must be mentioned that the aforesaid crosslinking methods to improve clarity have the drawback that processing operations subsequent to crosslinking such as extrusion, molding, or the like to put the crosslinked polymeric in the form of a shaped article to be passed on to the general public can only, if at all, be performed with the greatest difficulty. This is so because the substantially uniform crosslinking throughout the polymeric material greatly decreases the flow properties of the material to the point whereat the material is mainly thermoset instead of thermoplastic. Therefore, it is necessary in most cases to carry out all operations necessary to put the polymeric material in its final form, e.g. extrusion, molding, etc., before subjecting it to a crosslinking and curing operation to obtain improved clarity. Such a procedure is unworkable in the commercial field since small retailers who are equipped to perform only the necessary extrusion, molding, and similar operations cannot afford nor possess the know-how to perform subsequent crosslinking operations by irradiation or otherwise. Additionally, the cost of returning the uncrosslinked shaped article to the polymer manufacturer for improved clarity by crosslinking and curing would be prohibitive. Thus, a method to produce a polyethylene, and especially high density polyethylene and blends of high and low density polyethylene having improved clarity properties and which because of their flow properties can be subjected to subsequent shaping operations is a desideratum.

Surprisingly, it has now been discovered that blending a major portion of a parent polymer consisting essentially of polyethylene which has not been subjected to a crosslinking operation with a minor amount of a crosslinked polyethylene additive at a temperature above the melting point of the parent polymer will yield polyethylene having greatly improved clarity which can be subjected to subsequent processing and shaping operations.

Although the instant invention preferably blends a crosslinked high density polyethylene additive with high density polyethylene parent polymer and thereby obtains the greatest increase in clarity, the invention will also produce improved clarity when the crosslinked polyethylene additive is low or medium density ethylene polymer blended with a parent polyethylene in a broad density range, i.e., 0.91 to 0.97. Thus it is possible by means of this invention to improve the clarity of polyethylene having a density in the range 0.91 to 0.97 by blending therewith a minor amount of crosslinked polyethylene having a density range of 0.91 to 0.97. Additionally, it is possible to blend an additive comprising a mixture of cross-linked polyethylene consisting of polyethylene of various densities with a mixture of parent polyethylene having varying densities to improve the clarity thereof. Furthermore, although the polyethylenes known in the art today have a density in the range of about 0.91 to 0.97, a polyethylene having a density within the aforesaid range or even outside thereof will have its clarity improved by the practice of the instant invention. Obviously greater improvement in clarity is shown when the additive is crosslinked polyethylene having a density as high or higher than the parent polymer. However, some improvement in clarity is obtained when the additive has a density less than the parent ethylene polymer. This is especially true when the parent polymer has a density greater than 0.94.

The amount of crosslinked polyethylene blended in accordance with the instant invention is nominal in comparison to the increased clarity afforded thereby. Amounts of crosslinked polyethylene equal to about 0.01 to 10% by weight of the parent polymer are operable. Even greater amounts are workable but are unnecessary and less economical. A preferred amount of crosslinked polyethylene additive which is blended is in the range 0.5 to 5% by weight of the parent polymer.

The blending operation is performed at or above the melting point of the parent polymer. Temperatures ranging from the melting point of the parent polymer up to 200° C. or more are operable. A preferred temperature range for high density polyethylene is 150° to 175° C.

In all examples herein, unless otherwise noted, a Brabender Plastograph was used to blend the crosslinked polyethylene additive with the parent polymer above its melting point. However, other mechanisms, e.g., a Banbury mixer, are equally operable. It is also possible to feed the crosslinked polyethylene additive and the parent polyethylene polymer in particulate form at preset rates into the hopper of an extrusion or molding machine and accomplish the blending in the heated barrel thereof immediately preceding the shaping operation.

The flow properties of the polyethylene product produced by the instant invention are described as a function of the melt index. A polyethylene product which evidences a high melt index has a low melt viscosity and therefore better flow properties. Throughout the invention the melt indices (MI) were measured under the conditions specified in ASTMD 1238–52T. The melt index of the parent polyethylene is not critical and can be varied over a broad range within which the material is workable in processing or shaping operations. Nor is the initial melt index of the crosslinked polyethylene additive critical.

The clarity test devised specifically for evaluation of changes in the clarity of polyethylene consists of viewing, through a ½″ diameter hole centered in a horizontal sample table holding clarity test samples thereon, a glowing filament from a 2-watt concentrated arc lamp (Sylvania C2/D.C. point light source), the extreme tip of said filament being situated 3 inches below the bottom surface of said test sample. The clarity test samples are prepared by molding under 10,000 lbs. pressure at 350° F. and then air cooling to room temperature for unquenched samples or immersing in a $H_2O$ bath at room temperature for quenched samples. The results of the clarity test are expressed in terms of the clarity number (mils) which is defined as the maximum thickness of the sample in mils through which the glowing filament, as viewed from 1 foot above the sample table, can still be observed.

The crosslinking by irradiation of the minor amount of polyethylene additive to be blended with the parent polymer can be carried out by various methods. A preferred feature of the irradiation operation of the instant invention is treatment with high energy particle or corpuscular irradiation. Although the examples herein used high energy irradiation, i.e., from a Van de Graaff electron accelerator, it should be understood that the present invention is not limited thereto. Irradiation employing particles in the instant invention includes the use of positive ions (e.g. protons, alpha particles and deutrons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a GE resonant transformer, a synchrotron or the like. Furthermore, particle irradiation may also be supplied from radioactive isotopes or anatomic pile. The amount of high energy radiation which is employed in irradiating the polyethylene additive in the instant invention can vary between broad limits. Radiation dosages of less than a megarad up to 20 megarads or more are operable, preferably 1 to 10 megarads are employed. In addition, in performing this invention, it is not necessary that high energy irradiation be employed for crosslinking. Since the object of the irradiation is merely to crosslink the polyethylene, low energy irradiation such as ultra violet light may be used. UV irradiation at a wave length of about 254 millimicrons necessitates the incorporation of a UV sensitizer, e.g., benzophenone into the polyethylene prior to irradiation.

The irradiation step, if desired, can be performed in an inert atmosphere to insure the exclusion of oxygen and other materials which react with the free radicals formed thereby.

The polyethylene to be irradiated can be in various forms. A particulate form of small mesh size, e.g. 1 to 500 mesh or less is operable, preferably polyethylene particles in the mesh size range of 100 to 400 mesh are employed. However, the polyethylene in the form of crumb, sheeting, film and the like when subjected to irradiation or other crosslinking means is still operable within the teaching of this invention. It is preferred, however, to blend the additive in finely divided form into the parent polymer, therefore, such forms as crumb, etc. are preferably reduced to particulate form after irradiation to insure uniform blending with the parent polymer.

Finally, it should be mentioned that the minor amount of polyethylene additive can be crosslinked by chemical means. This can be accomplished by several methods using crosslinking agents, e.g. peroxides, diperoxides or azo-compounds well known to those skilled in the art.

The following examples will aid in explaining the instant invention, but are not to be deemed as limiting its scope.

EXAMPLE 1

15. g. of finely divided commercially available polyethylene having a melt index of 6.5 and a density of 0.960 was subjected to 10 megarads of high energy irradiation from a Van de Graaff electron accelerator at room temperature. This dosage was applied by using a pass system equal to 1 megarad/pass. The thus irradiated crosslinked polyethylene had a melt index of 0.0 and was used as an additive in the following examples:

EXAMPLE 2

0.38 g. of irradiated polyethylene additive from Example 1 were added to 38 g. of finely divided commercial polyethylene having a melt index of 0.7 and a density of 0.960. The admixture was charged to a Brabender Plastograph and milled for about 5 minutes at a temperature of 160° C. The resultant polyethylene product had a melt index of 0.85. Samples of the product were prepared for clarity tests by compression molding the samples into thin sheets (5-10 mils thick) on a Carver press at 10,000 pounds pressure at a temperature of 350° F. and thereafter cooling a portion of the samples in air to room temperature for unquenched clarity test samples and quenching the remainder of the samples in $H_2O$ at room temperature for quenched clarity test samples. Using the clarity test mentioned supra the unquenched sample had a clarity number of 40 mils and the quenched sample had a clarity number of 88 mils. As can be seen by the melt index of the resultant blended polyethylene product the flow properties of the product were not decreased.

In a control run 40 g. of finely divided commercial polyethylene having a melt index of 0.7 and a density of 0.960 were charged to the Brabender Plastograph and milled under the same conditions as the blended product in this example. The product from the control run had a melt index of 0.7 and a clarity number of 13 mils unquenched and 18 mils quenched.

A comparison of the clarity numbers of the blended sample with the control sample shows that the clarity of the blended sample increased 3 times as much in the unquenched state and almost 5 times as much in the quenched state.

EXAMPLE 3

0.38 g. of irradiated polyethylene from Example 1 were added to 38 g. of finely divided commercial polyethylene having a melt index of 5.0 and a density of 0.960. The admixture was milled in a Brabender Plastograph for about 5 minutes at 160° C. The resultant polyethylene product had a melt index of 5.0 and clarity numbers of 40 unquenched and 74 quenched.

Table I shows the results obtained from various percentages of polyethylene additive crosslinked by irradiation which were blended with the parent polyethylene polymer.

*Table I*

| Ex. No. | Weight percent of irradiated polyethylene additive [1] | Irradiation dosage [2] (megarads) | Blending time [3] (mins.) | Product characterization | | |
|---|---|---|---|---|---|---|
| | | | | Melt index [4] | Clarity number (mils) [5] | |
| | | | | | Unquenched | Quenched |
| 4 | 0.5 | 10 | 5 | 0.86 | 40 | 75 |
| 5 | 1.0 | 10 | 5 | 0.85 | 40 | 88 |
| 6 | 2.0 | 10 | 5 | 0.81 | 58 | 73 |
| 7 | 3.0 | 10 | 5 | 0.85 | 52 | 89 |
| 8 | 0 | 0 | 5 | 0.804 | 13 | 18 |
| 9 | 0 | 0 | 0 | 0.7 | 5 | 2 |

[1] Irradiated polyethylene additive had a melt index of 6.5 and a density of 0.960. Balance of blend was commercial polyethylene (melt index 0.7; density 0.960).
[2] Van de Graaff electron accelerator used as irradiation source.
[3] Blended in Brabender Plastograph at 160° C.
[4] Obtained by melt index procedure specified in ASTM D 1238-52T.
[5] Obtained by the clarity method described supra.

EXAMPLE 10

30 g. of commercial polyethylene (200 mesh) produced by the so-called Ziegler process and having a melt index in the range 6.0–7.0 was subjected to an irradiation dosage of 10 megarads from a Van de Graaff electron accelerator. Table II below shows the effect of various concentrations of this irradiated polymer additive on the clarity number of a commercial polyethylene having a density of 0.960 and a melt index of 1.0.

Table II

| Example No. | Parts of irradiated additive/100 pts. uncrosslinked polyethylene [1] | Clarity number (mils) [2] | |
|---|---|---|---|
| | | Quenched | Unquenched |
| 11 | 0.5 | 97–108 | 45–52 |
| 12 | 2.7 | 133–138 | 55–60 |
| 13 | 5.0 | 162–175 | 67–72 |

[1] Blended in Brabender Plastograph at 160° C. for 5 minutes.
[2] Obtained by clarity method described supra.

EXAMPLE 14

Commercially available conventional low density polyethylene (0.914) having a melt index of 2.0 was reduced to a mesh size of 200. The finely divided polymer was crosslinked by being subjected to an irradiation dosage of 10 megarads from a Van de Graaff electron accelerator prior to incorporation in commercially available polyethylene having a density of 0.96 and a melt index of 1.0. Although from Table III it is apparent that improvement in clarity is not as noted as when the more linear high density polymer is used as the additive, nevertheless some improvement in clarity was obtained. When uncrosslinked commercially available polyethylene having a density of 0.914 and a melt index of 2.0 is used as the additive no improvement in clarity was noted (Example 18).

Table III

| Example No. | Parts irradiated low density polyethylene additive [4] per 100 parts high density parent polyethylene [1] [5] | Clarity Number (mils) [3] | |
|---|---|---|---|
| | | Quenched | Unquenched |
| 15 | 0.5 | 43–50 | 18–25 |
| 16 | 2.7 | 46–53 | 11–16 |
| 17 | 5.0 | 36–42 | 6–13 |
| 18 | [2] 2.7 | 24–29 | <8 |

[1] Blended in Brabender Plastograph at 160° C. for 5 minutes.
[2] Additive was not subjected to crosslinking by irradiation.
[3] Obtained by clarity method described supra.
[4] Commercially available polyethylene; density 0.914; melt index 2.0.
[5] Commercially available polyethylene; density 0.96; melt index 1.0.

The following examples in Table IV show the effect of radiation dosage on the clarity of a high density polyethylene parent polymer.

Table IV

| Example No. | Weight percent of irradiated polyethylene additive [1] | Irradiation dosage [2] (megarads) | Product characterization | | |
|---|---|---|---|---|---|
| | | | Melt index [3] | Clarity number (mils) [4] | |
| | | | | Quenched | Unquenched |
| 19 | 0.5 | 0.5 | 0.91 | 32–38 | 17–26 |
| 20 | 0.5 | 1.0 | 0.920 | 34–43 | 21–29 |
| 21 | 0.5 | 5.0 | 0.91 | 78–86 | 46–52 |
| 22 | 0.5 | 10.0 | 0.850 | 81–88 | 48–55 |
| 23 | 0.5 | 20.0 | 0.88 | 98–103 | 43–52 |
| 24 | 5.0 | 0.5 | 0.97 | 64–68 | 31–37 |
| 25 | 5.0 | 1.0 | 0.72 | 77–82 | 50–55 |
| 26 | 5.0 | 5.0 | 0.80 | 115–120 | 70–78 |
| 27 | 5.0 | 10.0 | 0.64 | 159–167 | 67–75 |
| 28 | 5.0 | 20.0 | 0.61 | 100–107 | 66–71 |

[1] Irradiated polyethylene additive (200 mesh) had a melt index of 5.0. and a density of 0.96. Balance of blend was commercial polyethylene (melt index 1.0 density 0.96). Blending performed in a Brabender Plastograph at 160° C. for 5 minutes.
[2] Van de Graaff electron accelerator used as irradiation source.
[3] Obtained by melt index procedure specified in ASTM D–1238–52T.
[4] Obtained by the clarity method described supra.

The compositions of the instant invention may also contain conventional polyethylene compounding agents such as antioxidants, and anti-static and slip agents.

The polyethylene product produced by the instant invention can be used in many applications, especially those in which clarity is required in the processed article. Such uses include film and ribbon for packaging, yarn, filament, sheeting, coating and the like.

I claim:

1. A blended composition consisting essentially of polyethylene having a density in the range 0.91 to 0.97 and a minor amount, between about 0.01 to 10% by weight of said polyethylene, of crosslinked polyethylene having a density in the range 0.91 to 0.97.

2. A process for producing a blended polyethylene composition of improved clarity which comprises blending polyethylene having a density in the range 0.91 to 0.97 at a temperature above its melting point with a minor amount, 0.01 to 10% by weight of said polyethylene, of crosslinked polyethylene having a density in the range 0.91 to 0.97.

3. The process according to claim 2 wherein the crosslinked polyethylene was crosslinked by high energy irradiation capable of delivering a dosage of 0.5 to 20 megarads.

References Cited in the file of this patent
UNITED STATES PATENTS
2,928,756     Campbell     Mar. 15, 1960
2,956,035     Mock     Oct. 11, 1960
2,956,042     Underwood et al.     Oct. 11, 1960

OTHER REFERENCES
Renfrew et al.: "Polythene," Interscience Publishers, Inc., New York (1960), 2nd Edition, pages 312 and 313.